(12) United States Patent
Stremlau

(10) Patent No.: US 12,243,501 B1
(45) Date of Patent: Mar. 4, 2025

(54) AUTOMATIC DISPLAY CONFIGURATION USING REFLECTED ILLUMINATION

(71) Applicant: NVIDIA Corporation, Santa Clara, CA (US)

(72) Inventor: Thorsten Peter Stremlau, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/638,407

(22) Filed: Apr. 17, 2024

(51) Int. Cl.
G09G 5/00 (2006.01)

(52) U.S. Cl.
CPC ..... *G09G 5/006* (2013.01); *G09G 2320/0247* (2013.01); *G09G 2320/08* (2013.01); *G09G 2340/0435* (2013.01)

(58) Field of Classification Search
CPC ....... G09G 2320/0247; G09G 2320/08; G09G 2340/0435; G09G 5/006
See application file for complete search history.

(56) References Cited

U.S. PATENT DOCUMENTS

| | | |
|---|---|---|
| 7,999,801 B1 | 8/2011 | Priem |
| 8,537,119 B1 | 9/2013 | Grivna et al. |
| 10,503,456 B2 | 12/2019 | Dimitrov et al. |
| 11,144,754 B2 | 10/2021 | Hu et al. |
| 11,798,514 B2 | 10/2023 | Spitzer et al. |

*Primary Examiner* — Abbas I Abdulselam
(74) *Attorney, Agent, or Firm* — Taylor English Duma L.L.P.

(57) ABSTRACT

In various examples, computing system display settings may be configured automatically based at least on display illumination patterns. For example, a system(s) may determine one or more locations of one or more displays associated with a computing device based at least on image data depicting a user of the computing device. In some instances, the image data may be captured during a period of time in which the display(s) may be operating at one or more respective frequencies. During this period of time, the system(s) may cause the display(s) to operate at the respective frequency(ies), and the image data may depict one or more reflections of the display(s) off one or more portions of the user. The system(s) may then determine the location(s) of the display(s) based at least on correlating one or more frequencies associated with the reflection(s) to the respective frequency(ies) of the displays.

20 Claims, 9 Drawing Sheets

AUTOMATIC DISPLAY CONFIGURATION USING REFLECTED ILLUMINATION

BACKGROUND

Computing devices may connect to and/or use electronic displays (e.g., monitors, screens, etc.) to provide visual output. In some scenarios, computing devices may be connected to multiple displays, which may provide users with enhanced productivity, multitasking capabilities, and/or immersive experiences. For instance, by extending their desktop workspaces across multiple screens, users may efficiently manage various tasks simultaneously, such as working on documents, browsing the web, viewing multimedia content, and/or monitoring system performance.

However, unlike single-monitor setups in which the display configuration may be straightforward and automatic, the setup for multiple monitors may often require user intervention to customize display orientations and/or alignment. That is, setting up multiple displays on today's computing systems usually involves a manual configuration process, which may require users to adjust display settings and/or position monitors appropriately to ensure seamless integration and optimal performance. Additionally, if a computing device is moved from one operating environment to another, such as from a user's home office to an enterprise office space, the display settings may need to be manually updated each time the computing device is moved between the different operating environments.

SUMMARY

Embodiments of the present disclosure relate to automatic display configuration using illuminated reflections. Systems and methods are disclosed for automatically configuring computing system display settings by determining monitor locations based at least on image data depicting reflections of the monitors off different portions of a user.

In contrast to conventional systems, such as those described above, the systems of the present disclosure, in some embodiments, may be able to determine one or more locations corresponding to one or more displays (e.g., electronic displays, monitors, etc.) associated with a computing device based at least on image data depicting a user of the computing device. For example, the systems may cause the display(s) to refresh (e.g., update, flicker, flash, etc.) at one or more respective frequencies for a period of time. During this period of time, the systems may use a camera (e.g., associated with the computing device) to capture a series of images depicting one or more portions of an object, such as a user of the computing device. The systems may then determine the location(s) corresponding to the display(s) based at least on one or more images of the series of images.

In at least one embodiment, because the series of images may be captured during the same period of time while the display(s) is operating at the respective frequency(ies), the image(s) of the series of images may indicate one or more frequencies associated with one or more portions of an illumination pattern (e.g., reflections of light off one or more portions of the object/user). As described herein, the portion(s) of the illumination pattern may correspond to the display(s) and, as such, the frequency(ies) associated with the portion(s) of the illumination pattern may be correlated with the respective frequency(ies) of the displays to determine the location(s) of the display(s). In some examples, the systems of the present disclosure may then determine configuration data associated with the display(s), which may include a layout indicating one or more positions of the display(s) relative to one another. The configuration data may then, in some examples, be stored in a memory associated with the computing device.

BRIEF DESCRIPTION OF THE DRAWINGS

The present systems and methods for automatic display configuration using illuminated reflections are described in detail below with reference to the attached drawing figures, wherein.

DETAILED DESCRIPTION

Figure 1:
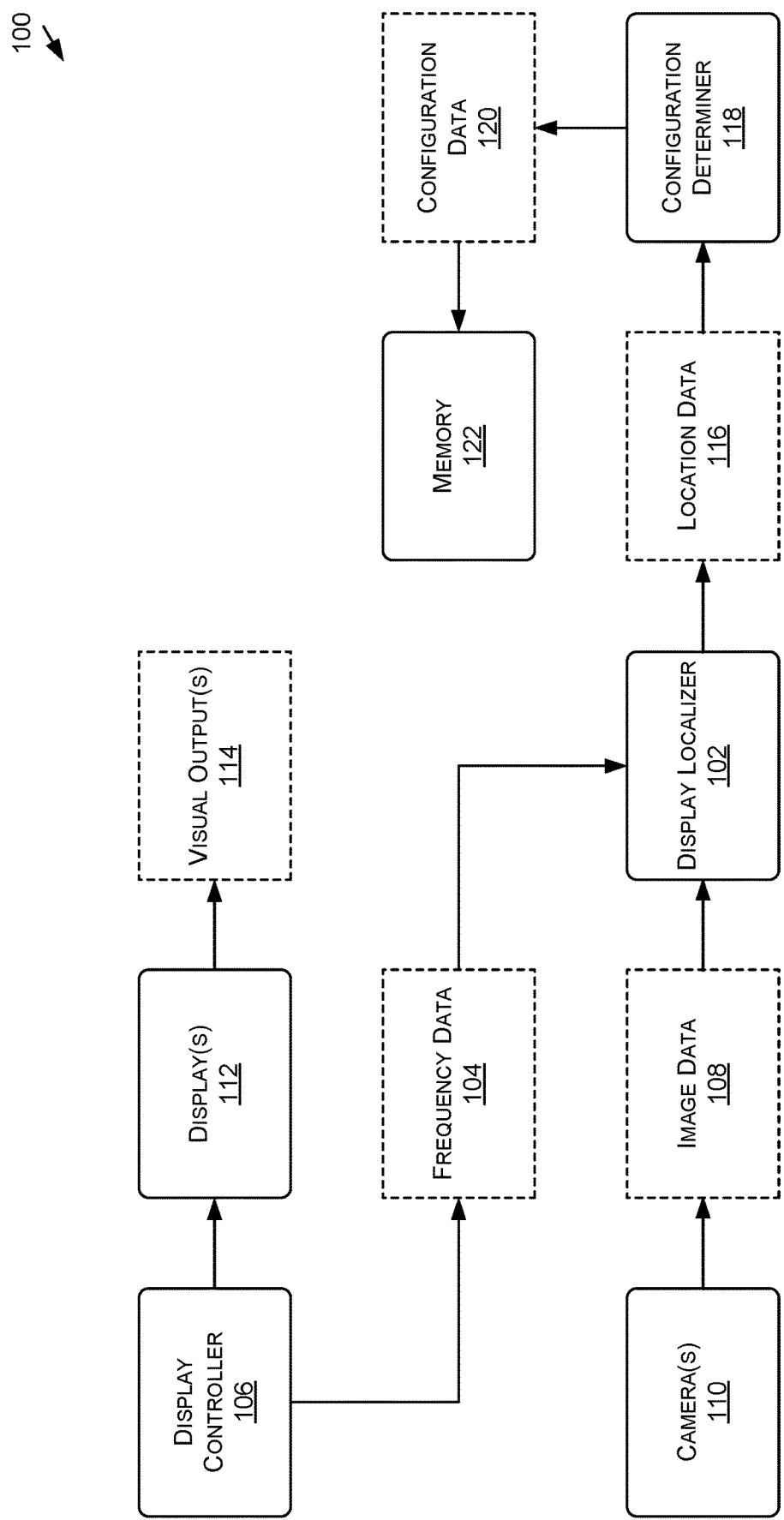
FIG. 1 is a data flow diagram illustrating an example process for automatically configuring display settings associated with a computing device, in accordance with some embodiments of the present disclosure.

Systems and methods are disclosed related to automatic display configuration using illuminated reflections. For instance, a system(s) may determine to execute a process for determining a layout (and/or other settings or configurations) associated with one or more displays (e.g., electronic displays, monitors, screens, etc.) connected to a computing device. In some examples, the system(s) may determine to execute the process responsive to the computing device being powered on. Additionally, or alternatively, the system(s) may determine to execute the process based at least on detecting a change associated with an operating environment of the computing device. The change associated with the operating environment may be detected based at least on a determination that the computing device is connected to one or more unknown displays and/or a connection(s) has occurred. Additionally, or alternatively, the change associated with the operating environment may be detected based at least on a determination that one or more current displays the computing device is connected to are different than one or more previous displays the computing device was connected to.

As part of the process, the system(s) may, in some examples, cause the display(s) to operate at one or more respective frequencies for a period of time. For instance, the system(s) may cause a first display to operate at a first frequency, cause a second display to operate at a second frequency that is different than the first frequency, cause a third display to operate at a third frequency that is different than the first frequency and the second frequency, and so forth. In some examples, causing the display(s) to operate at the respective frequency(ies) may cause one or more screen refresh rates associated with the display(s) to update/refresh at the respective frequency(ies). In this way, the system(s) may effectively cause the screen(s) of the display(s) to flash and/or flicker at the respective frequency(ies). In some examples, the frequency(ies) may be set by the system(s) to specific values (e.g., 60 Hz, 90 Hz, 120 Hz, etc.) and/or the frequency(ies) may be default operating frequencies of the display(s). Additionally or alternatively, the system(s) may detect or otherwise determine the operating frequency of one or more of the displays.

In various examples, the system(s) may obtain a series of images captured during the period of time. The images of the series of images may be captured using one or more cameras associated with the computing device and/or the display(s). For instance, the camera(s) may be integrated into the computing device and/or the display(s) (e.g., an integrated webcam) and/or external to the computing device and/or the display(s) (e.g., a USB connected camera). In some examples, the images may be captured at one or more frame rates associated with the camera(s) (e.g., 10 frames per second (fps), 20 fps, 30 fps, etc.). By way of example, and not limitation, if the frame rate of a camera is 10 fps and the period of time is 5 seconds, then the series of images may include 50 image frames.

In some examples, the series of images may depict an object, such as a user of the computing device. The series of images may also depict an illumination pattern associated with the object based at least on differences between the frame rate(s) associated with the camera(s) and the respective frequency(ies) associated with the display(s). In some examples, one or more portions of the illumination pattern may correspond to light projected by the display(s) during the period of time. That is, the screen(s) of the display(s) may coincidentally emit light in association with outputting visual content, and this light may illuminate and/or reflect off various portions of the object (e.g., a user's face, facial features, and/or other physical characteristics) at different instances of time and be captured by the camera(s). By way of example, and not limitation the series of images may include a first image frame corresponding to a first instance of time in which a first display screen may be outputting visual content and illuminating a first portion of the object, a second image frame corresponding to a second instance of time in which the first display screen may be updating/refreshing the visual content and not illuminating the first portion of the object, a third image frame corresponding to a third instance of time in which the first display screen may be outputting an updated version of the visual content and illuminating the first portion of the object, and so forth.

In some instances, the system(s) may determine one or more locations corresponding to the display(s) based at least on the series of images. For instance, based at least on the series of images, the system(s) may determine one or more portions of the illumination pattern that correspond to the respective frequency(ies) of the display(s) based at least on one or more frequencies associated with the portion(s) of the illumination pattern. Additionally, the system(s) may determine which portion(s) of the object correspond to which portion(s) of the illumination pattern. In this way, the system(s) may predict the location(s) of the display(s). In other words, the system(s) may determine (e.g., predict, propose, estimate, etc.) a location where a display may be positioned relative to the object based on which portion(s) of the object are illuminated in the series of images, and determine which specific display occupies that location by associating the respective frequency of that specific display with a frequency of the illumination pattern for those portion(s) of the object.

By way of example, and not limitation, consider a scenario in which a computing device is connected to two displays, A and B, which may be operating at 60 Hz and 120 Hz, respectively. In such a scenario, the series of images may include one or more first images that depict the left side of a user's face being illuminated, as well as one or more second images that depict the right side of the user's face being illuminated. The system(s) may determine, based on this information, that one of the two displays is located somewhere to the left of the user and that the other display is located somewhere to the right of the user. Continuing the example, the series of images may further depict that the left side of the user's face is being illuminated at a rate corresponding to 120 Hz and that the right side of the user's face is being illuminated at a rate corresponding to 60 Hz. As such, the system(s) may then determine that the identity of the display positioned to the left of the user is display B, and that the identity of the display positioned to the right of the user is display A.

In some instances, to determine the location(s) of the display(s), the system(s) may compute a temporal Fourier Transform of a light intensity signal over the period of time for one or more points (e.g., pixels) included in one or more images of the series of images. That is, the system(s) may determine one or more representations (e.g., signals) indicating one or more changes in value (e.g., illumination intensity) associated with the point(s) included in the image(s) over the course of the period of time. The system(s) may then compute the temporal Fourier Transform of these representation(s) to change a domain associated with the representation(s), which may then, collectively, correspond to a spectrum of frequency components. The system(s) may then determine one or more dominant frequency components in the spectrum for one or more of the point(s), which may correspond to the frequency of the display(s) and/or the illumination pattern. In some examples, the system(s) may use the frequency information from one or more of the point(s) to estimate the frequency signature for one or more of the display(s) in the scene that are illuminating the object.

In various examples, the system(s) may determine one or more locations of one or more cameras used to capture the series of images, and the location(s) of the camera(s) may be used to determine the location(s) of the displays. In some examples, the location(s) of the camera(s) may be known by the system(s) based at least on a configuration of the computing device (e.g., the camera(s) may be integrated into a display of the computing device). That is, the location of the camera(s) with respect to a location of at least one display of the display(s) may be known by the system(s) prior to executing the process, and the system(s) may use this information to determine the location(s) of the other display(s), as well as to determine the location of the at least one display relative to the object (e.g., user). Additionally, or alternatively, the system(s) may determine the location of the camera(s) with respect to the display(s) based at least on the portion(s) of the illumination pattern.

In some examples, the system(s) may generate configuration data associated with the display(s). For instance, the configuration data may include at least one or more positions of the display(s) with respect to one another. The system(s) may determine the position(s) based at least on the location(s) of the display(s) determined with respect to the object. Additionally, in some examples, the configuration data may include display picture settings (e.g., color, brightness, contrast, etc.), primary display settings, such as user interface (UI) element display locations (e.g., where and/or on which monitor(s) to display certain UI elements), and/or the like. In some examples, the configuration data may be stored by the system(s) in a memory associated with the computing device. In this way, the computing device may use the configuration data to automatically configure display settings when the computing device is connected to the display(s) again in the future.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models such as large language models (LLMs) or visual language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 is a data flow diagram illustrating an example process 100 for automatically configuring display settings associated with a computing device, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 illustrated in FIG. 1 includes a display localizer 102 that obtains frequency data 104 from a display controller 106 and obtains image data 108 from one or more cameras 110. The display controller 106 may at least partially control one or more displays 112 that generate one or more visual outputs 114. The display localizer 102 may generate location data 116 based at least on the frequency data 104 and the image data 108, and the location data 116 may be provided to a configuration determiner 118. The configuration determiner 118 may then generate configuration data 120 and store the configuration data 120 in a memory 122.

In various examples, the display localizer 102, the display controller 106, and the configuration determiner 118 may represent components and/or modules that are stored in a memory of a computing device, such as the memory 122 shown in FIG. 1, which may correspond to the memory 804 of the computing device(s) 800 described below. For instance, one or more of the display localizer 102, the display controller 106, and/or the configuration determiner 118 may be software components capable of being executed by the computing device(s) 800 to perform the process 100 for automatically configuring display settings associated with the computing device(s) 800. Additionally, while the display localizer 102, the display controller 106, and the configuration determiner 118 are illustrated in FIG. 1 as separate entities representing a distributed system, this may not always be the case.

As noted above, the process 100 may be executed to automatically configure display settings associated with a computing device. As such, the process 100 may be executed, in some examples, responsive to the computing device powering on. Additionally, or alternatively, the process 100 may be executed responsive to a change with respect to an operating environment of the computing device, such as the computing device being connected to one or more unknown displays.

In some examples, the display controller 106 may modify the visual output(s) 114 of the display(s) 112 for a period of time by controlling the update rates of the display(s) 112. For instance, the display controller 106 may cause the display(s) 112 to operate at one or more respective frequencies for a period of time. For instance, the display controller 106 may cause a first display of the display(s) 106 to operate at a first frequency, cause a second display of the display(s) 106 to operate at a second frequency that is different than the first frequency, cause a third display of the display(s) 106 to operate at a third frequency that is different than the first frequency and the second frequency, and so forth.

In some examples, causing the display(s) 112 to operate at respective frequencies may cause one or more screen refresh rates associated with the display(s) 112 to update/ refresh at the respective frequencies. That is, the visual output(s) 114 of the display(s) 112 may be updated/refreshed at the respective frequencies such that the display(s) 112 may flicker and/or flash at those respective frequencies. In some examples, when the display(s) 112 produces the visual output(s) 114 (e.g., to a screen), the display(s) 112 may emit light in association with the visual output(s) 114, and this emitted light may illuminate and/or reflect off various portions of the object (e.g., a user's face, facial features, and/or other physical characteristics) at different instances of time. The light may not be visible to the naked human eye but is visible to (detectable by) the one or more cameras 110 and is present in the image data 108.

Figure 2A:
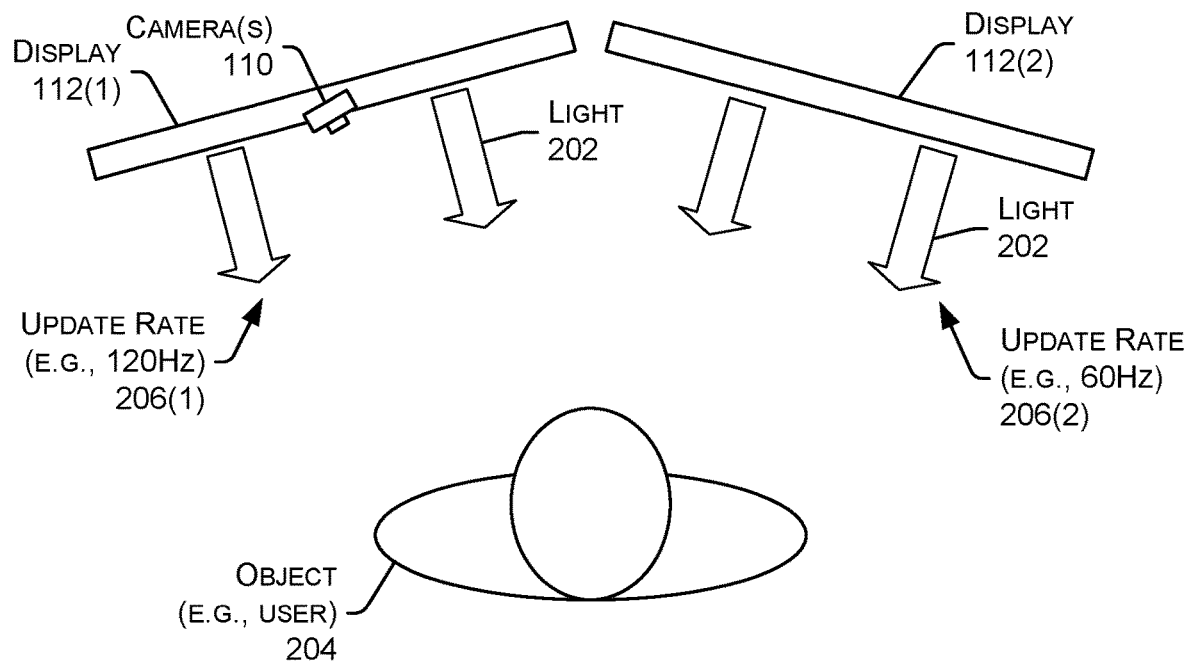
FIGS. 2A and 2B collectively illustrate an example visualization associated with determining locations of displays based at least on reflections of the displays off a user, in accordance with some embodiments of the present disclosure.

For example, FIG. 2A illustrates an example in which a first display 112(1) and a second display 112(2) project light 202 at different frequencies onto an object 204, which corresponds to a user (e.g., the user's face). In some examples, the first display 112(1) may have a first update rate 206(1) and the second display 112(2) may have a second updated rate 206(2) that is different than the first updated rate 206(1). For instance, the first update rate 206(1) of the first display 112(1) may correspond to 120 Hz and the second update rate 206(2) of the second display 112(2) may correspond to 60 Hz. In this way, the light 202 may be projected from the displays and onto the object 204 at the respective update rates.

With reference again to FIG. 1, the display controller 106 may, in some instances, also provide frequency data 104 to the display localizer 102. The frequency data 104 may indicate respective frequencies (e.g., the first update rate 206(1) and the second update rate 206(2)) of the display(s) 112. In some examples, the frequency data 104 may include the normal, operative frequencies of the display(s) 112 and/or the modified frequencies that the display controller 106 may set for the display(s) 112 during the process 100.

Figure 2B:
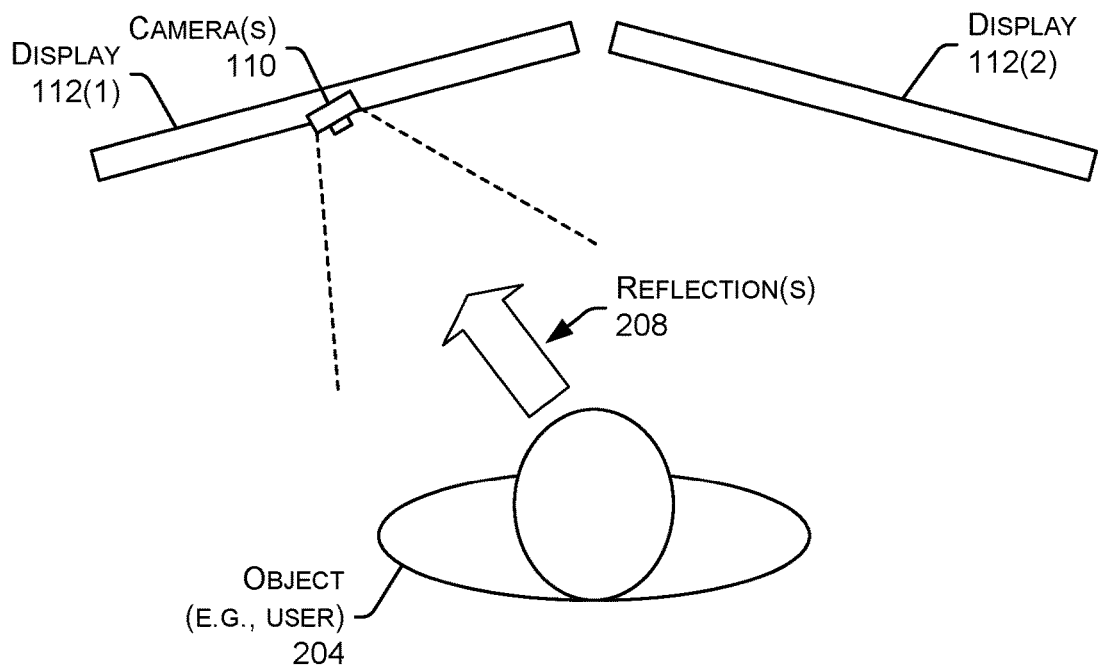

As described herein, the camera(s) 110 may be used to capture the image data 108 during the same period of time as when the display controller 106 may control the visual display(s) 112 to produce the visual output(s) 114 at the respective frequencies. For example, FIG. 2B illustrates an example of the camera(s) 110 capturing image data depicting the object 204 and one or more reflection(s) 208 off one or more portions of the object 204, in accordance with some embodiments of the present disclosure. The camera(s) 110 may capture the image data during the same over an overlapping period of time as the first display 112(1) and the second display 112(2) project the light 202 onto the object 204 at the respective frequencies.

With reference again to FIG. 1, in various examples, the image data 108 may include a series of images captured during the period of time by the camera(s) 110. The camera(s) 110 may be associated with the computing device and/or the display(s) 112. For instance, the camera(s) 110 may be integrated into the computing device and/or the display(s) 112 (e.g., an integrated webcam) and/or external to the computing device and/or the display(s) 112 (e.g., a USB connected camera). In some examples, images of the image data 108 may be captured at one or more frame rates associated with the camera(s) 110.

In some examples, the image data 108 may depict an object, such as a user of the computing device. The image data 108 may also depict an illumination pattern (e.g., spatial and/or temporal) associated with the object based at least on differences between the frame rate(s) associated with the camera(s) 110 and the respective frequency(ies) associated with the display(s) 112. In some examples, one or more portions of the illumination pattern may correspond to light projected by the display(s) 112 during the period of time. That is, the screen(s) of the display(s) 112 may emit light in association with outputting the visual content (e.g., the visual output(s) 114), and this emitted light may illuminate and/or reflect off various portions of the object (e.g., a user's face, facial features, and/or other physical characteristics) at different instances of time and be captured by the camera(s) 110. For instance, the image data 108 may include a first image frame corresponding to a first instance of time in which the display(s) 112 may generate first visual output(s) 114 and illuminate a first portion of the object, a second image frame corresponding to a second instance of time in which the display(s) 112 may be updating/refreshing the visual output(s) 114 and not illuminating the first portion of the object, a third image frame corresponding to a third instance of time in which the display(s) 112 may be outputting an updated version of the visual content and illuminating the first portion of the object, and so forth.

Figure 3:
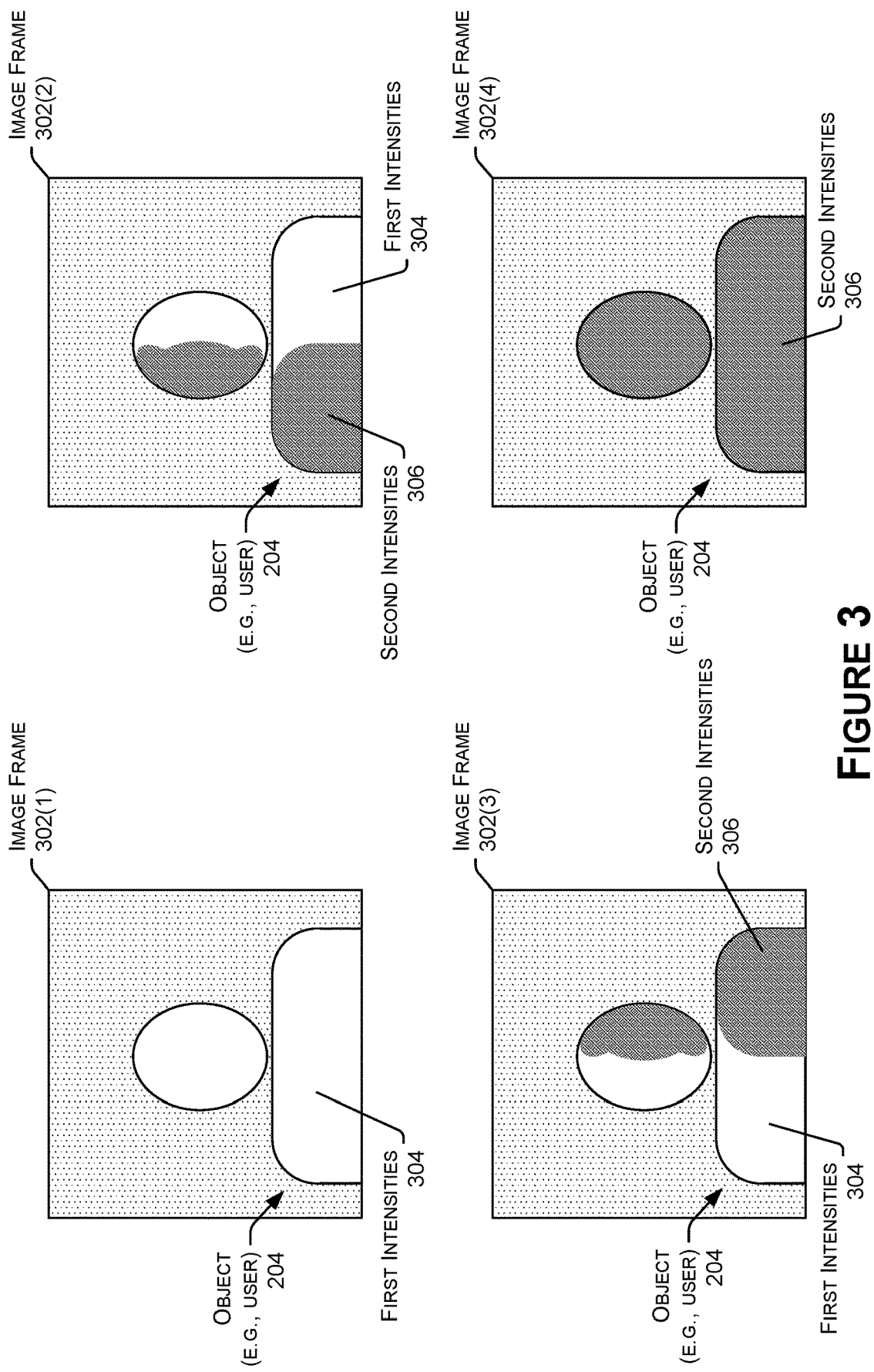
FIG. 3 illustrates example detail associated with image frames that may be captured while displays are operating at respective frequencies, in accordance with some embodiments of the present disclosure.

With reference to FIG. 3 as another example, FIG. 3 illustrates example detail associated with various image frames 302(1)-302(4) that may be captured by the camera(s) 110 while the display(s) 112 are operating at respective frequencies, in accordance with some embodiments of the present disclosure. The image frames 302(1)-302(4) depict different intensities associated with the object 204 being illuminated by the display(s) 112. For instance, the object 204 may be illuminated by a configuration of displays similar to the configuration of the first display 112(1) and the second display 112(2) shown in FIGS. 2A and 2B. In the first image frame 302(1), the entire portion of the object 204 is illuminated at one or more first intensities 304, which may correspond to an instance of time in which both the first display 112(1) and the second display 112(2) are outputting visual content. In the second image frame 302(2), a first portion (e.g., left side) of the object 204 is illuminated at the first intensities 304, while a second portion (e.g., right side) of the object 204 is illuminated at one or more second intensities 306 (e.g., non-illuminated), which may correspond to an instance of time in which the first display 112(1) is outputting visual content and the second display 112(2) is updating. In the third image frame 302(3), the first portion of the object 204 is illuminated at the second intensities 306, while the second portion of the object 204 is illuminated at the first intensities 304, which may correspond to an instance of time in which the first display 112(1) is updating and the second display 112(2) is outputting visual content. In the fourth image frame 302(4), the entire portion of the object 204 is illuminated at the second intensities 306, which may correspond to an instance of time in which both the first display 112(1) and the second display 112(2) are updating.

With reference back again to FIG. 1, in some examples, the display localizer 102 may determine the location data 116 based at least on the frequency data 104 and/or the image data 108. For instance, the display localizer 102 may use the image data 108 and the frequency data 104 to determine locations where the display(s) 112 may be positioned relative to the object based on which portion(s) of the object are illuminated in the image data 108, and determine which specific display(s) 112 occupy those locations by associating the respective frequency of the specific display(s) 112 with a frequency of the illumination pattern for those portion(s) of the object.

By way of example, and not limitation, consider the scenario shown in FIG. 2A in which a computing device may be connected to the first display 112(1) and the second display 112(2), which may be operating at 120 Hz and 60 Hz, respectively. In such a scenario, the image data 108 may include a series of images having one or more first images that depict the left side of a user's face being illuminated, similar to the object 204 of the example image frame 302(2) of FIG. 3. Additionally, the series of images may include one or more second images that depict the right side of the user's face being illuminated, similar to the object 204 of the example image frame 302(3). As such, the display localizer 102 may determine, based on this information, that one of the two displays is located somewhere to the left of the user and that the other display is located somewhere to the right of the user, however the display localizer 102 may not know the actual identities of those displays without the frequency information. Continuing the example, the series of images of the image data 108 may further depict that the left side of the user's face is being illuminated at a rate corresponding to 120 Hz and that the right side of the user's face is being illuminated at a rate corresponding to 60 Hz (e.g., the left side of the user's face may be illuminated in twice the number of image frames as the right side of the user's face). As such, display localizer 102 may then determine that the identity of the display positioned to the left of the user is the first display 112(1), and that the identity of the display positioned to the right of the user is the display 112(2) based at least on the frequency data 104 indicating that those are the frequencies of the two displays.

In some instances, to determine the location(s) of the display(s) 112, the display localizer 102 may additionally, or alternatively, compute a temporal Fourier Transform of a light intensity signal over the period of time for one or more points (e.g., pixels) included in the image data 108. That is, the display localizer 102 may determine one or more representations (e.g., signals) indicating one or more changes in value (e.g., illumination intensity) associated with the point(s) included in the image data 108 over the course of the period of time. The display localizer 102 may then compute the temporal Fourier Transform of these representation(s) to change a domain associated with the representation(s), which may then, collectively, correspond to a spectrum of frequency components. The display localizer 102 may then determine one or more dominant frequency component(s) in the spectrum for one or more of the point(s), which may correspond to the frequencies of the display(s) 112 indicated in the frequency data 104. In some examples, the display localizer 102 may use the frequency information from one or more of the point(s) to estimate the frequency signature for one or more of the display(s) 112 in the scene that are illuminating the object.

Figure 4:
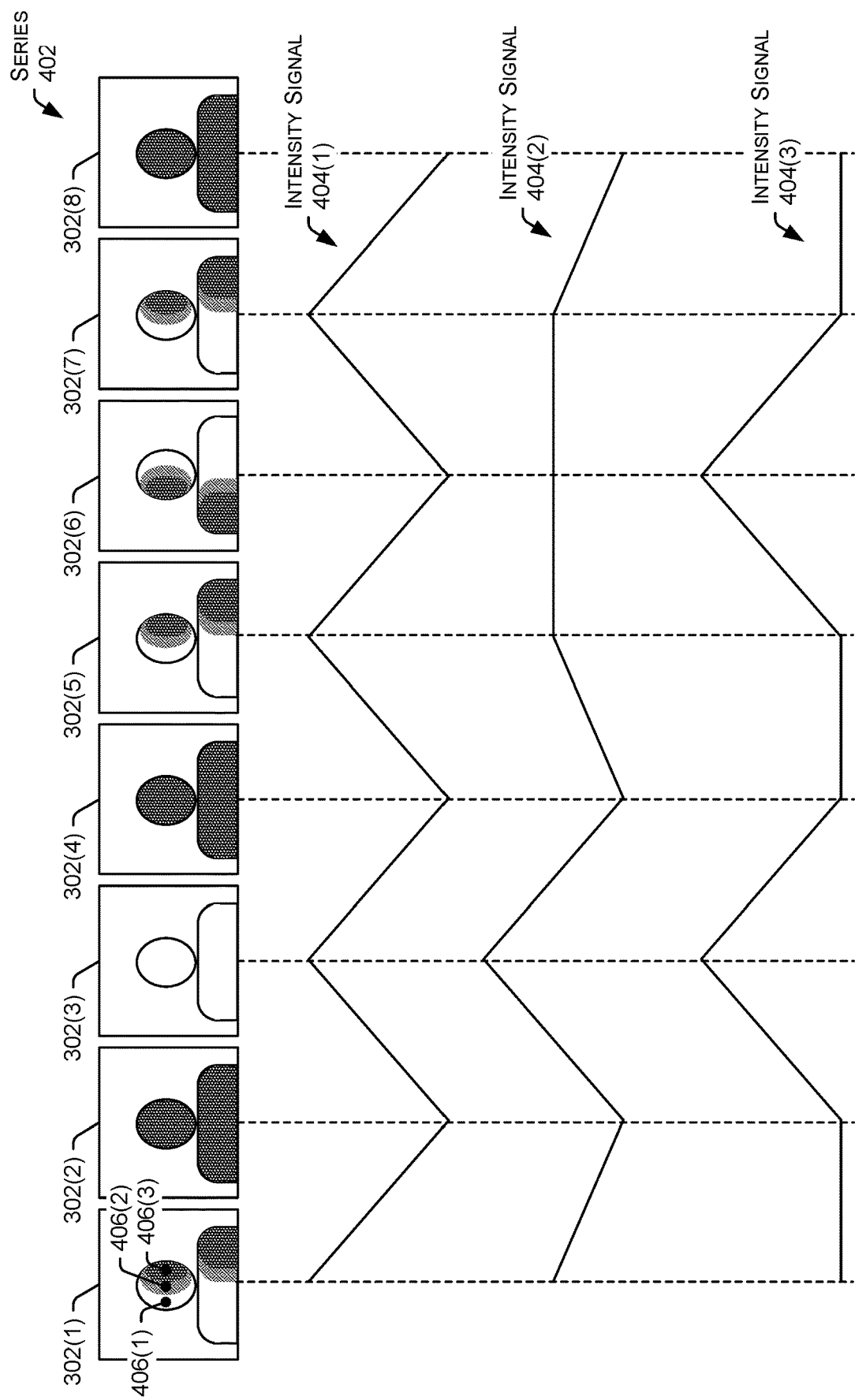
FIG. 4 illustrates an example visualization associated with intensity signals corresponding to different points (e.g., pixels) included in the series of images frames, in accordance with some embodiments of the present disclosure.

For example, FIG. 4 illustrates an example visualization associated with intensity signals corresponding to different points (e.g., pixels) included in the series 402 of images frames 302(1)-302(8), in accordance with some embodiments of the present disclosure. As shown, the series 402 of the image frames 302(1)-302(8) may depict different portions of a user that are illuminated at different intensities at different instances of time. The intensity signal 404(1) may correspond to a first point 406(1) that is disposed on the user's right side, the intensity signal 404(2) may correspond to a second point 406(2) that is disposed in the center of the user's face, and the intensity signal 404(3) may correspond to a third point 406(3) that is disposed on the user's left side.

By analyzing the intensity signal 404(1), it may become apparent that the first point 406(1) is illuminated at a high intensity every other image frame and illuminated at a low intensity in the remaining image frames in between. Analyzing the intensity signal 404(2), the second point 406(2) is illuminated at high intensities, medium intensities, and low intensities in various image frames. However, it may be determined that the second point 406(2) is illuminated at a high intensity whenever both the first point 406(1) and the second point 406(3) correspond to a high intensity, that the second point 406(2) is illuminated at a low intensity whenever both the first point 406(1) and the second point 406(3) correspond to a low intensity, and that the second point 406(2) is illuminated at a medium intensity whenever only one of the first point 406(1) or the second point 406(3) correspond to a high intensity. Analyzing the third intensity signal 404(3), it may be determined that the third point 406(3) is illuminated at a high frequency every third image frame.

Based at least on the intensity signal(s), the display localizer 102 may determine which displays are more dominantly illuminating which portions of the user. For instance, the display localizer 102 may determine a frequency of the intensity signal 404(1), associated that frequency with a particular display's frequency, and then determine the location of that particular display based at least on the portions of the user that are illuminated at that frequency. Similarly, the display localizer 102 may determine another frequency of the intensity signal 404(3), associated that other frequency with another display's frequency, and then determine the location of that other display based at least on the portions of the user that are illuminated at that other frequency. The display localizer 102 may also further refine the locations of the displays based at least on the intensity signal 404(2), which may indicate the point 406(2) is in an overlapping region of the display illuminations.

With reference back again to FIG. 1, the display localizer 102 may also determine one or more locations of the camera(s) 110 used to capture the image data 108, and the location(s) of the camera(s) 110 may be used to determine the location(s) of the display(s) 112. In some examples, the location(s) of the camera(s) 110 may be known by the display localizer based at least on a configuration of the computing device (e.g., the camera(s) 110 may be integrated into a display of the computing device). That is, the location of the camera(s) 110 with respect to a location of at least one display of the display(s) 112 may be known by the display localizer 102 prior to execution of the process, and the display localizer 102 may use this information to determine the location(s) of the other display(s) 112, as well as to determine the location of the at least one display relative to the object (e.g., user). Additionally, or alternatively, the display localizer may determine the location of the camera(s) 110 with respect to the display(s) 112 based at least on the portion(s) of the illumination pattern. For instance, the display localizer 102 may determine that a shape of at least a portion of the illumination pattern corresponds to a field of view of the camera(s) 110 being substantially aligned with a projection path of a display, as will be described in further detail below with reference to FIG. 5.

In some examples, the configuration determiner 118 may determine the configuration data 120 based at least on the location data 116. The configuration data 120 may include, in some examples, a layout indicating at least one or more positions of the display(s) 112 with respect to one another (e.g., an arrangement of the displays). The configuration determiner 118 may determine the position(s) based at least on the location(s) of the display(s) 112 determined with respect to the object, which may be indicated in the location data 116. Additionally, in some examples, the configuration data 120 may include other settings associated with the display(s) 112 and determined by the configuration determiner 118 as well, such as picture settings (e.g., color, brightness, contrast, etc.), display orientation (e.g., portrait, landscape, etc.), primary display settings (e.g., which display of the display(s) 112 is to be set as the primary display), and/or the like.

In some examples, the configuration data 120 and/or the layout may indicate which of the display(s) is to be set as a main display for the computing device. The main display may comprise the primary monitor or screen that serves as the primary output device that displays the main desktop environment, user interface elements, and running applications. In some examples, the configuration determiner 118 may determine which display is the main display based at least on the illumination pattern. For instance, the configuration determiner 118 may set the main display as whichever display is illuminating a certain portion(s) of the object. As an example, if the configuration determiner 118 notices that a display is positioned directly in front of a user based on the illumination pattern, the configuration determiner 118 may set that display as the main display in the configuration data 120 and/or the layout. Additionally, or alternatively, the configuration determiner 118 may set the main display based on the location(s) of the camera(s). For instance, the configuration determiner 118 may set the main display in the configuration data 120 as a display that is associated with the camera (e.g., camera is integrated into the display, positioned on top of the display, etc.). Additionally, or alternatively, the configuration determiner 118 may set the main display based on previous configuration layouts or user preferences, which may be stored in, for example, the memory 122.

In some examples, the configuration data 120 may indicate a scale associated with the display(s). For instance, the configuration determiner 118 may estimate a distance between the display(s) and the object and set a scale setting to adjust the size of text, application, and/or other items displayed on the screen. The scale setting may then be included in the configuration data 120. The configuration data 120 and/or the layout may also include an orientation(s) of the display(s). For instance, the configuration determiner 118 may determine whether the display(s) are oriented in a portrait, landscape, and/or other orientation based at least on the illumination pattern, and set the orientation(s) in the configuration data 120.

In some examples, the configuration determiner 118 may store the configuration data 120 in the memory 122, which may correspond to a memory of a computing device associated with the display(s) 112 and/or the camera(s) 110. In this way, the computing device may use the configuration data 120 to automatically configure display settings when the computing device is connected to the display (s 112 again in the future.

Figure 5:
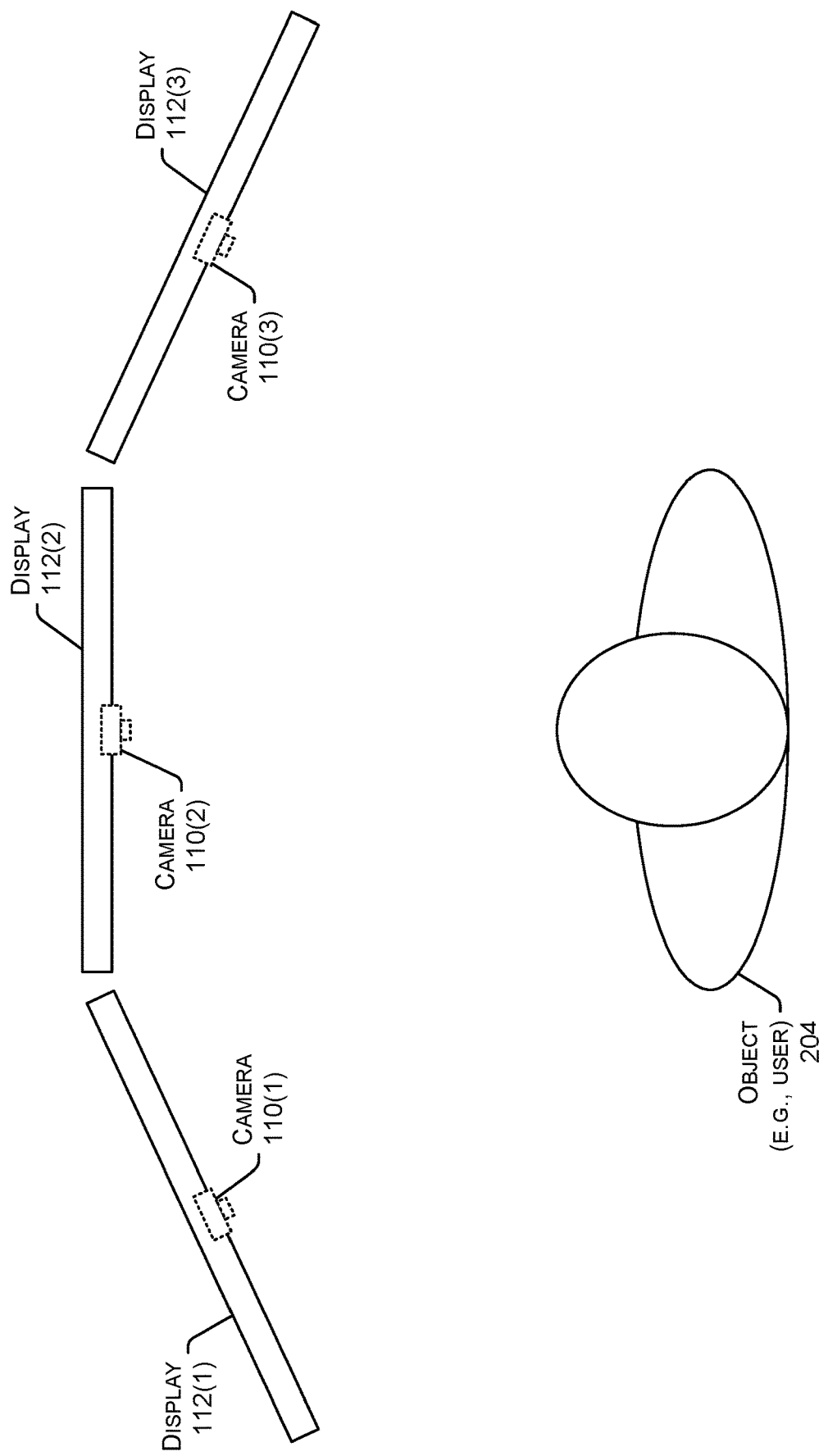
FIG. 5 illustrates an example configuration of displays that may use the automatic display system configuration techniques disclosed herein, in accordance with some embodiments of the present disclosure.

With reference to FIG. 5, FIG. 5 illustrates an example configuration of displays 112(1)-112(3) that may use the automatic display system configuration techniques disclosed herein, in accordance with some embodiments of the present disclosure. For instance, the displays 112(1)-112(3) may be connected to or otherwise associated with a computing device that uses the displays 112(1)-112(3) for visually outputting information, such as user interfaces, browsers, documents, images, videos, and/or the like. While many of the examples herein are described with reference to two displays (e.g., a first display and a second display), the techniques may be used in operating environments where a computing device is connected to any number of displays, such as the three displays 112(1)-112(3) shown in FIG. 5, as well as any other number of displays (e.g., 1, 2, 3, 4, 5, etc.).

Additionally, the techniques disclosed herein may be used with any number of cameras, such as the camera(s) 110(1)-110(3). The camera(s) 110(1)-110(3) are represented in broken lines in FIG. 5 to illustrate that any number of the camera(s) 110(1)-110(3) may be used, as well as that the disclosed techniques may be used to determine locations of the display(s) 112(1)-112(3) regardless of where the camera(s) 110(1)-110(3) may be positioned. That is, in a scenario in which a single camera is used, the camera may be positioned in any one of the locations corresponding to the camera(s) 110(1)-110(3).

Additionally, the techniques disclosed herein may be used to determine locations and/or positions of displays arranged in other configurations than shown in the accompanying drawings. For instance, the disclosed techniques may be used to detect configurations in which one or more displays are stacked vertically, when one or more displays are arranged side-by-side, when one or more displays are oriented horizontally and/or vertically, different sizes of displays, and/or the like.

Figure 6:
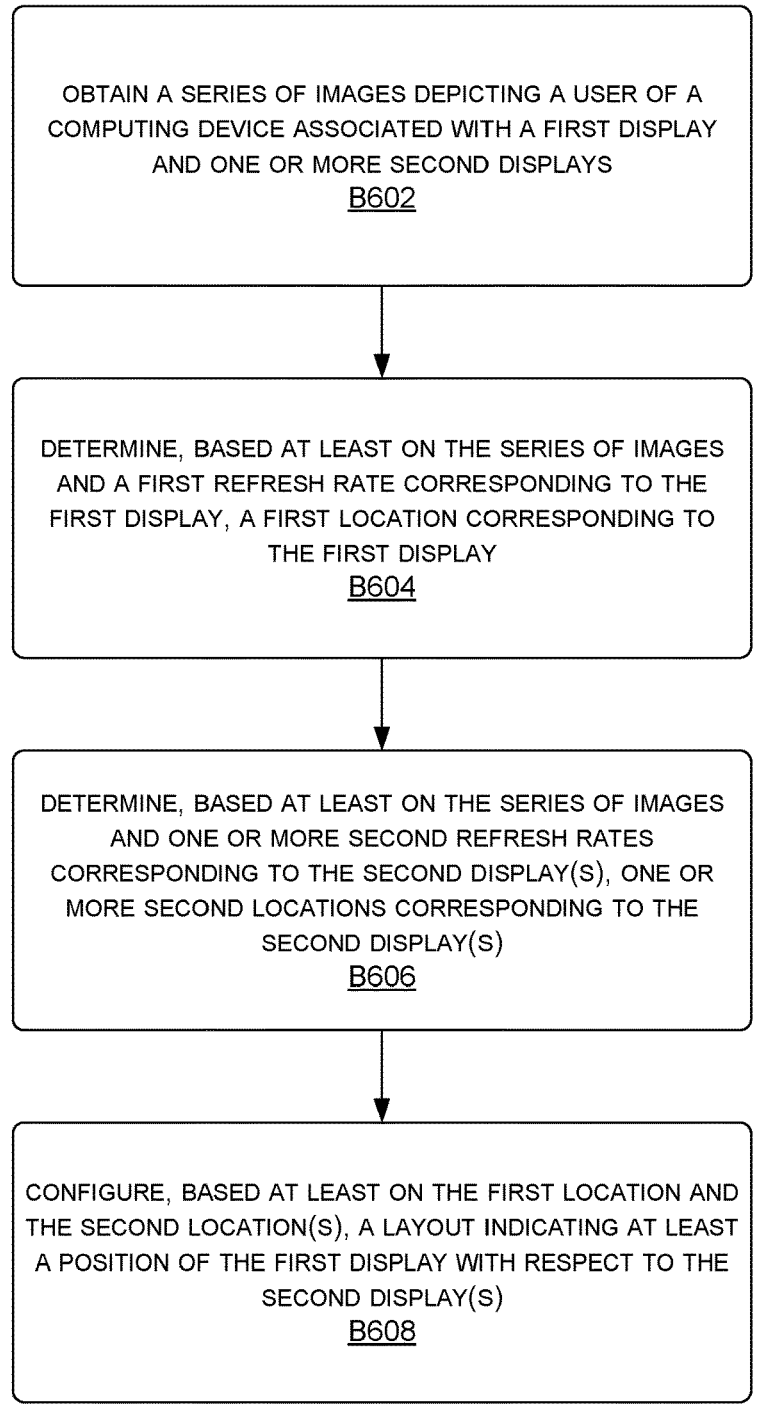
FIG. 6 is a flow diagram illustrating an example method associated with automatically configuring display settings for a computing device, in accordance with some embodiments of the present disclosure.
Figure 7:
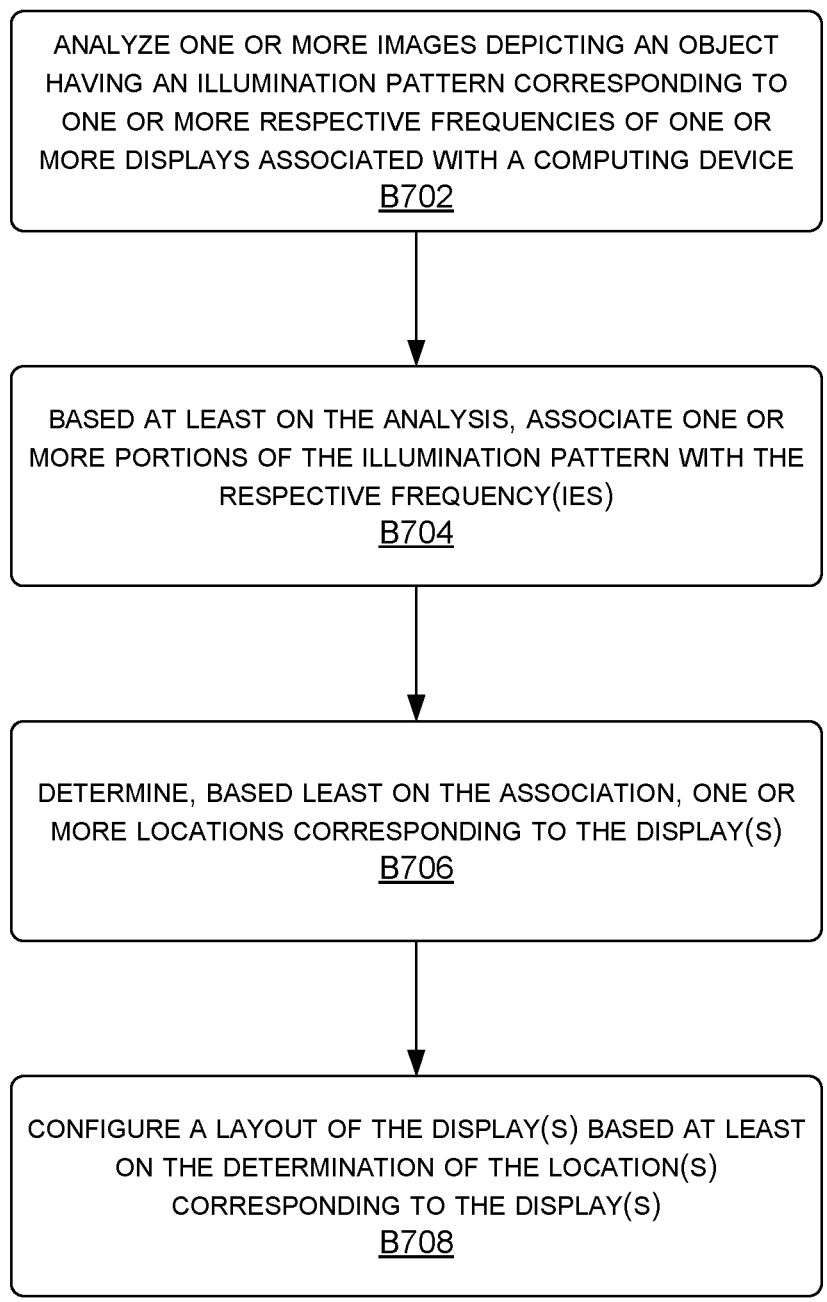
FIG. 7 is a flow diagram illustrating an example method associated with determining one or more locations corresponding to one or more displays, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600 and 700 are described, by way of example, with respect to the system of FIG. 1. However, this method may additionally or alternatively be executed by any one system, or any combination of systems, including, but not limited to, those described herein.

With reference to FIG. 6, FIG. 6 is a flow diagram illustrating an example method 600 associated with automatically configuring display settings for a computing device, in accordance with some embodiments of the present disclosure. The method 600, at block B602, includes obtaining a series of images depicting a user of a computing device associated with a first display and one or more second displays. For instance, the display localizer 102 may obtain the image data 108 including the series of images depicting the user of the computing device associated with the display(s) 112, which may include the first display and the one or more second displays. In some examples, the camera(s) 110 may capture the series of images of the image data 108 during a period of time while the display(s) 112 are updating at respective rates.

The method 600, at block B604, includes determining, based at least on the series of images and a first refresh rate corresponding to the first display, a first location corresponding to the first display. For instance, the display localizer 102 may determine the first location corresponding to the first display of the display(s) 112 based at least on the image data 108 and the frequency data 104. In some examples, the image data 108 may depict an illumination pattern, and the display localizer 102 may determine one or more first portions of the illumination pattern that correspond to the frequency of the first display.

The method 600, at block B606, includes determining, based at least on the series of images and one or more second refresh rates corresponding to the second display(s), one or more second locations corresponding to the second display(s). For instance, the display localizer 102 may determine the second location(s) corresponding to the second display(s) of the display(s) 112 based at least on the image data 108 and the frequency data 104. In some examples, the image data 108 may depict the illumination pattern, and the display localizer 102 may determine one or more second portions of the illumination pattern that correspond to the frequency(ies) of the second display(s).

The method 600, at block B608, includes configuring, based at least on the first location and the second location(s), a layout indicating a position of the first display with respect to the second display(s). For instance, the configuration determiner 118 may generate the configuration data 120 based at least on the location data 116. The configuration data 120 may indicate at least the position of the first display with respect to the second display(s).

With reference to FIG. 7, FIG. 7 is a flow diagram illustrating an example method 700 associated with determining one or more locations corresponding to one or more displays, in accordance with some embodiments of the present disclosure. The method 700, at block B702, includes analyzing one or more images depicting an object having an illumination pattern corresponding to one or more respective frequencies of one or more displays associated with a computing device. For instance, the display localizer 102 may analyze the image data 108, which may include the image(s) depicting the object having the illumination pattern corresponding to the respective frequency(ies), which may be indicated in the frequency data 104, of the one or more display(s) 112 associated with the computing device.

The method 700, at block B704, includes, based at least on the analyzing, associating one or more portions of the illumination pattern with the respective frequency(ies). For instance, the display localizer 102 may associate the portion(s) of the illumination pattern depicted in the image data 108 with the respective frequency(ies) indicated in the frequency data 104 based at least on the analyzing. For example, if the display localizer 102 determines a portion of the illumination pattern is illuminating at a frequency of 60 Hz, and the frequency data indicates a monitor is operating at 60 Hz, the display localizer 102 may associate that monitor with that portion of the illumination pattern.

The method 700, at block B706, includes determining, based least on the associating, one or more locations corresponding to the display(s). For instance, the display localizer 102 may determine the location(s) corresponding to the display(s) 112 based at least on the associating. For example, if the display localizer 102 associates a portion of the illumination pattern to a frequency of a display, and the illumination pattern appears on the user's right side of the user's face, then the display localizer 102 may determine the display is located somewhere to the right of the user.

The method 700, at block B708, includes configuring a layout of the display(s) based at least on the determination of the location(s) corresponding to the display(s). For instance, the configuration determiner 118 may configure the layout of the display(s) by generating the configuration data 120 based at least on the location data 116. The configuration data 120 may indicate at least a first position of a first display of the display(s) with respect to one or more second displays of the display(s).

Example Computing Device

Figure 8:
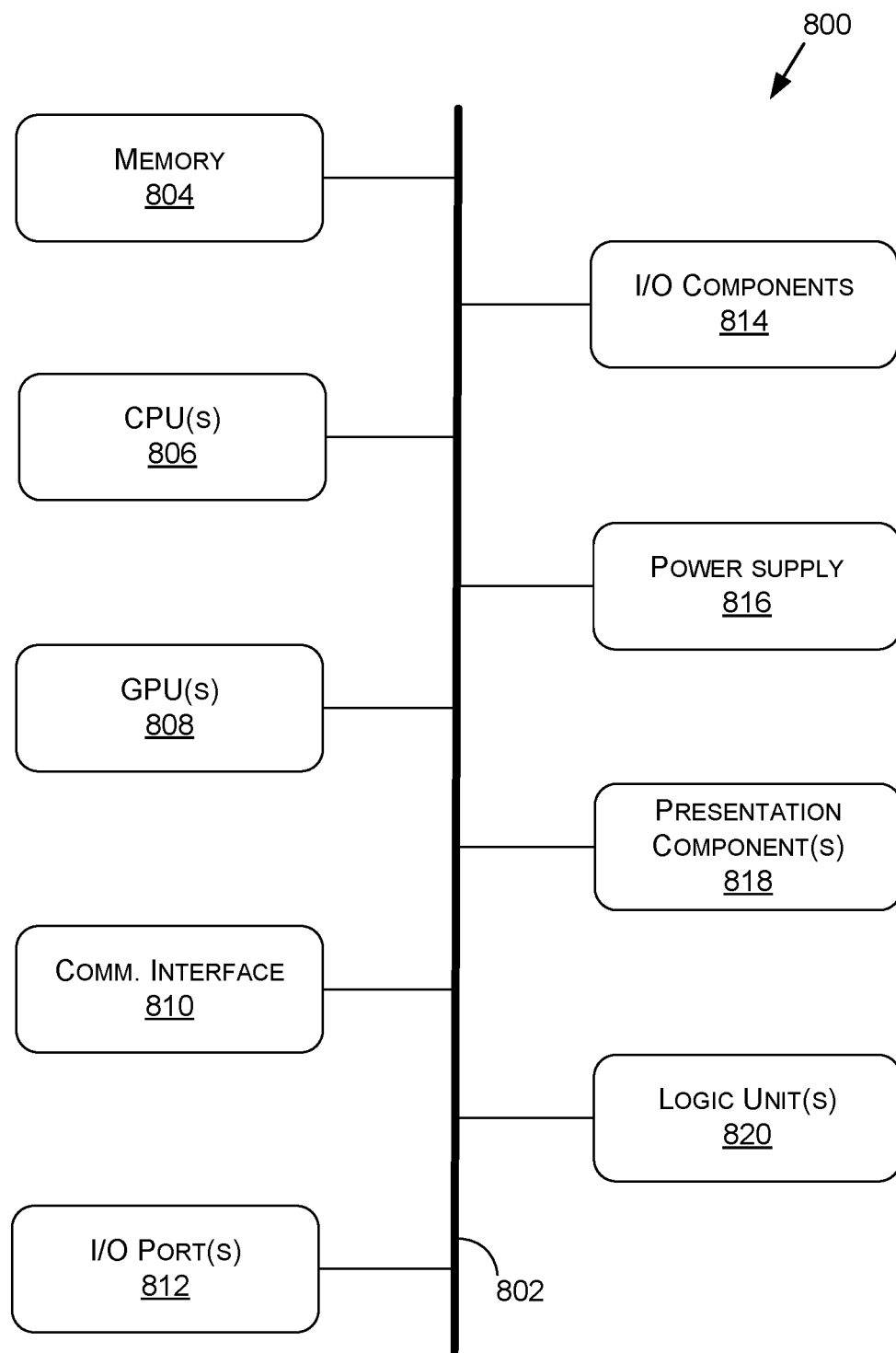
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
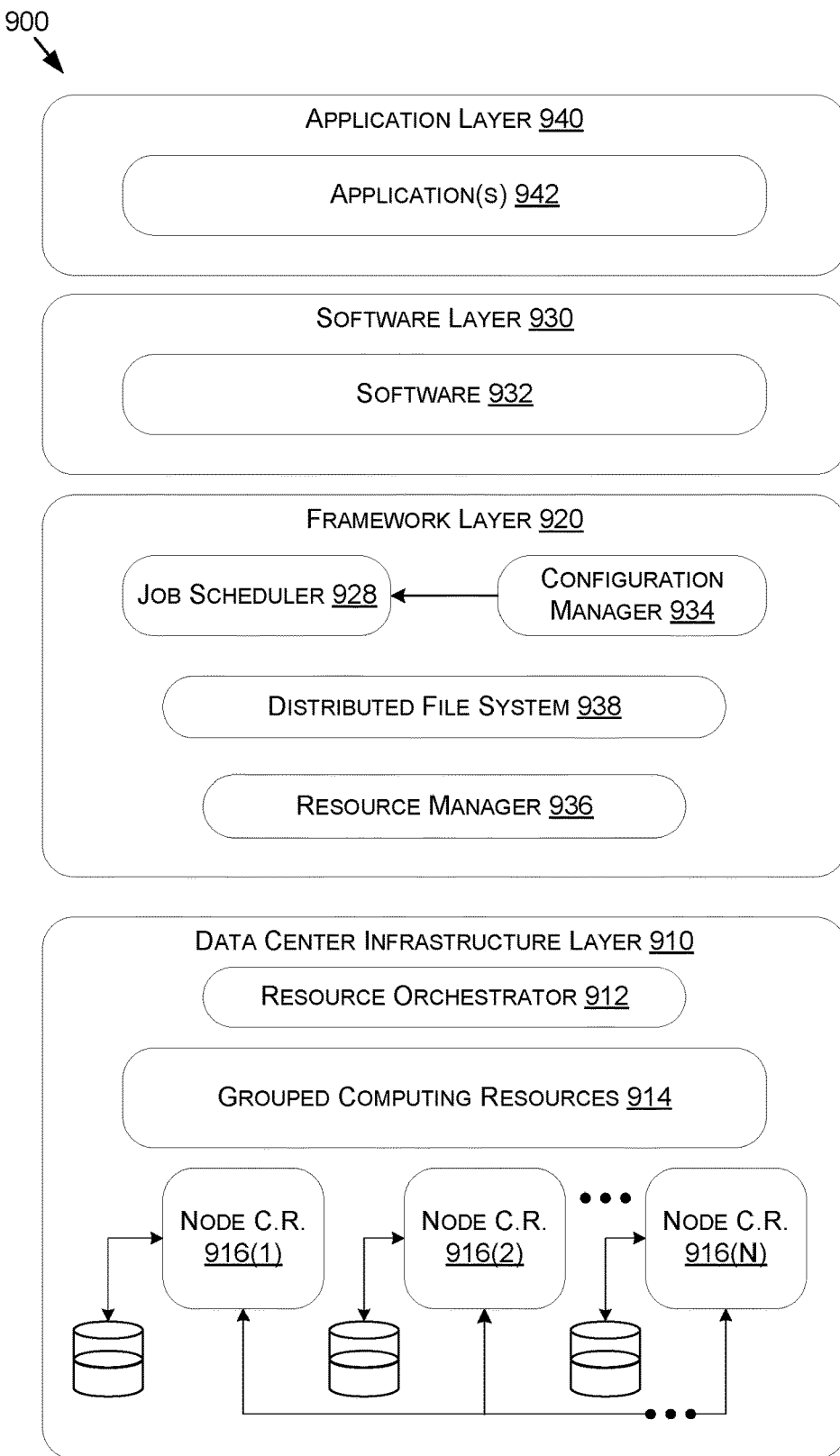
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A. A method comprising: obtaining a series of images depicting a user of a computing device associated with a first display and one or more second displays; determining, based at least on the series of images and a first refresh rate corresponding to the first display, a first location corresponding to the first display; determining, based at least on the series of images and one or more second refresh rates corresponding to the one or more second displays, one or more second locations corresponding to the one or more second displays; and configuring, based at least on the first location and the one or more second locations, a layout indicating at least a position of the first display with respect to the one or more second displays.

B. The method as recited in paragraph A, wherein the determining of the first location corresponding to the first display comprises: determining, based at least on the series of images, that a frequency associated with one or more reflections of illumination emitted using the first display corresponds to the first refresh rate; and determining, based at least on the frequency corresponding to the first refresh rate, an association between the first display and the one or more reflections.

C. The method as recited in any one of paragraphs A-B, wherein: the first location corresponding to the first display is determined based at least on a first illumination of a first portion of the user depicted in one or more first images of the series of images, and the one or more second locations corresponding to the one or more second displays are determined based at least on one or more second illuminations of one or more second portions of the user depicted in one or more second images of the series of images.

D. The method as recited in any one of paragraphs A-C, further comprising determining, based at least on one or more values corresponding to one or more points included in the series of images, one or more representations indicating one or more changes in the one or more values over a period of time, wherein at least one of the first location or the one or more second locations are determined based at least on the one or more representations.

E. The method as recited in any one of paragraphs A-D, further comprising determining a location associated with a camera used to capture the series of images based at least on an association between the camera and the first display, wherein the determining of the one or more second locations corresponding to the one or more second displays is further based at least on the location associated with the camera.

F. The method as recited in any one of paragraphs A-E, further comprising: causing, during a period of time, the first display to be updated at the first refresh rate to cause a first screen associated with the first display to at least one of update, flicker, or flash at a first frequency corresponding to the first refresh rate, and causing, during the period of time, the one or more second displays to be updated at the one or more second refresh rates to cause one or more second screens associated with the one or more second displays to at least one of update, flicker, or flash at one or more second frequencies corresponding to the one or more second refresh rates.

G. The method as recited in any one of paragraphs A-F, wherein the first location and the one or more second locations are determined based at least on one or more illumination patterns associated with the user depicted in the series of images, the one or more illumination patterns corresponding to one or more sources of illumination projected by at least one of the first display or the one or more second displays.

H. A system comprising: one or more processors to: analyze one or more images depicting an object having an illumination pattern corresponding to one or more respective frequencies of one or more displays associated with a computing device; based at least on the analysis, associate one or more portions of the illumination pattern with the one or more respective frequencies; determine, based least on the association, one or more locations corresponding to the one or more displays; and configure a layout of the one or more displays based at least on the determination of the one or more locations corresponding to the one or more displays.

I. The system as recited in paragraph H, the one or more processors further to: determine, based at least on the one or more images, one or more frequencies associated with the one or more portions of the illumination pattern; and determine that the one or more frequencies correspond to the one or more respective frequencies of the one or more displays, wherein the association of the one or more portions of the illumination pattern with the one or more respective frequencies is further based at least on the one or more frequencies corresponding to the one or more respective frequencies.

J. The system as recited in any one of paragraphs H-I, wherein the determination of the one or more locations corresponding to the one or more displays comprises: determining a first location of a first display of the one or more displays based at least on a first position, with respect to the object, of a first portion of the illumination pattern; and determining a second location of a second display of the one or more displays based at least on a second position, with respect to the object, of a second portion of the illumination pattern.

K. The system as recited in any one of paragraphs H-J, the one or more processors further to: cause a first screen of a first display of the one or more displays to update at a first rate corresponding to a first frequency of the one or more respective frequencies; and cause a second screen of a second display of the one or more displays to update at a second rate corresponding to a second frequency of the one or more respective frequencies that is different than the first frequency.

L. The system as recited in any one of paragraphs H-K, the one or more processors further to determine, based at least on one or more values corresponding to one or more points of the one or more images, one or more representations indicating one or more changes in the one or more values over a period of time, wherein the determination of the one or more locations corresponding to the one or more displays is further based at least on the one or more representations.

M. The system as recited in any one of paragraphs H-L, the one or more processors further to determine a second association between the one or more displays and one or more cameras associated with the computing device, wherein the determination of the one or more locations corresponding to the one or more displays is further based at least on the second association.

N. The system as recited in any one of paragraphs H-M, the one or more processors further to cause the one or more displays to operate at the one or more respective frequencies during a period of time to cause the one or more displays to at least one of update, flicker, or flash at the one or more respective frequencies.

O. The system as recited in any one of paragraphs H-N, the one or more processors further to: determine, based at least on the one or more locations, a position of at least a first display of the one or more displays with respect to at least a second display of the one or more displays; and store, in a memory associated with the computing device, configuration data indicating at least a layout corresponding to the position.

P. The system as recited in any one of paragraphs H-O, wherein the determination of the one or more locations corresponding to the one or more displays is based at least on one or more reflections of illumination off the object depicted in the one or more images.

Q. The system as recited in any one of paragraphs H-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model (LLM); a system for performing operations using a visual language model (VLM); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

R. A processor comprising: one or more circuits to automatically configure a layout of one or more displays associated with a computing device by determining one or more locations corresponding to the one or more displays based at least on one or more images depicting one or more portions of an object at least partially illuminated by at least one display of the one or more displays over a period of time and one or more respective frequencies at which the one or more displays are operating at within the period of time.

S. The processor as recited in paragraph R, the one or more circuits further to generate one or more representations indicating one or more variations, over the period of time, of one or more values corresponding to one or more pixels included in the one or more images, wherein the determination of the one or more locations is further based at least on the one or more representations.

T. The processor as recited in any one of paragraphs R-S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model (LLM); a system for performing operations using a visual language model (VLM); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:
obtaining a series of images depicting a user of a computing device associated with a first display and one or more second displays;
determining, based at least on the series of images and a first refresh rate corresponding to the first display, a first location corresponding to the first display;
determining, based at least on the series of images and one or more second refresh rates corresponding to the one or more second displays, one or more second locations corresponding to the one or more second displays; and
configuring, based at least on the first location and the one or more second locations, a layout indicating at least a position of the first display with respect to the one or more second displays.

2. The method of claim 1, wherein the determining of the first location corresponding to the first display comprises:
determining, based at least on the series of images, that a frequency associated with one or more reflections of illumination emitted using the first display corresponds to the first refresh rate; and
determining, based at least on the frequency corresponding to the first refresh rate, an association between the first display and the one or more reflections.

3. The method of claim 1, wherein:
the first location corresponding to the first display is determined based at least on a first illumination of a first portion of the user depicted in one or more first images of the series of images, and
the one or more second locations corresponding to the one or more second displays are determined based at least on one or more second illuminations of one or more second portions of the user depicted in one or more second images of the series of images.

4. The method of claim 1, further comprising determining, based at least on one or more values corresponding to one or more points included in the series of images, one or more representations indicating one or more changes in the one or more values over a period of time, wherein at least one of the first location or the one or more second locations are determined based at least on the one or more representations.

5. The method of claim 1, further comprising determining a location associated with a camera used to capture the series of images based at least on an association between the camera and the first display, wherein the determining of the one or more second locations corresponding to the one or more second displays is further based at least on the location associated with the camera.

6. The method of claim 1, further comprising:
causing, during a period of time, the first display to be updated at the first refresh rate to cause a first screen associated with the first display to at least one of update, flicker, or flash at a first frequency corresponding to the first refresh rate, and
causing, during the period of time, the one or more second displays to be updated at the one or more second refresh rates to cause one or more second screens associated with the one or more second displays to at least one of update, flicker, or flash at one or more second frequencies corresponding to the one or more second refresh rates.

7. The method of claim 1, wherein the first location and the one or more second locations are determined based at least on one or more illumination patterns associated with the user depicted in the series of images, the one or more illumination patterns corresponding to one or more sources of illumination projected by at least one of the first display or the one or more second displays.

8. A system comprising:
one or more processors to:
analyze one or more images depicting an object having an illumination pattern corresponding to one or more respective frequencies of one or more displays associated with a computing device;
based at least on the analysis, associate one or more portions of the illumination pattern with the one or more respective frequencies;
determine, based least on the association, one or more locations corresponding to the one or more displays; and
configure a layout of the one or more displays based at least on the determination of the one or more locations corresponding to the one or more displays.

9. The system of claim 8, the one or more processors further to:
determine, based at least on the one or more images, one or more frequencies associated with the one or more portions of the illumination pattern; and
determine that the one or more frequencies correspond to the one or more respective frequencies of the one or more displays,
wherein the association of the one or more portions of the illumination pattern with the one or more respective frequencies is further based at least on the one or more frequencies corresponding to the one or more respective frequencies.

10. The system of claim 8, wherein the determination of the one or more locations corresponding to the one or more displays comprises:
determining a first location of a first display of the one or more displays based at least on a first position, with respect to the object, of a first portion of the illumination pattern; and
determining a second location of a second display of the one or more displays based at least on a second position, with respect to the object, of a second portion of the illumination pattern.

11. The system of claim 8, the one or more processors further to:
cause a first screen of a first display of the one or more displays to update at a first rate corresponding to a first frequency of the one or more respective frequencies; and
cause a second screen of a second display of the one or more displays to update at a second rate corresponding to a second frequency of the one or more respective frequencies that is different than the first frequency.

12. The system of claim 8, the one or more processors further to determine, based at least on one or more values corresponding to one or more points of the one or more images, one or more representations indicating one or more changes in the one or more values over a period of time, wherein the determination of the one or more locations corresponding to the one or more displays is further based at least on the one or more representations.

13. The system of claim 8, the one or more processors further to determine a second association between the one or more displays and one or more cameras associated with the computing device, wherein the determination of the one or more locations corresponding to the one or more displays is further based at least on the second association.

14. The system of claim 8, the one or more processors further to cause the one or more displays to operate at the one or more respective frequencies during a period of time to cause the one or more displays to at least one of update, flicker, or flash at the one or more respective frequencies.

15. The system of claim 8, the one or more processors further to:
determine, based at least on the one or more locations, a position of at least a first display of the one or more displays with respect to at least a second display of the one or more displays; and
store, in a memory associated with the computing device, configuration data indicating at least a layout corresponding to the position.

16. The system of claim 8, wherein the determination of the one or more locations corresponding to the one or more displays is based at least on one or more reflections of illumination off the object depicted in the one or more images.

17. The system of claim 8, wherein the system is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system implemented using a robot;
a system for performing one or more generative AI operations;
a system for performing operations using a large language model (LLM);
a system for performing operations using a visual language model (VLM);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. A processor comprising:

one or more circuits to automatically configure a layout of one or more displays associated with a computing device by determining one or more locations corresponding to the one or more displays based at least on one or more images depicting one or more portions of an object at least partially illuminated by at least one display of the one or more displays over a period of time and one or more respective frequencies at which the one or more displays are operating at within the period of time.

19. The processor of claim 18, the one or more circuits further to generate one or more representations indicating one or more variations, over the period of time, of one or more values corresponding to one or more pixels included in the one or more images, wherein the determination of the one or more locations is further based at least on the one or more representations.

20. The processor of claim 18, wherein the processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model (LLM);

a system for performing operations using a visual language model (VLM);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

\* \* \* \* \*